(12) United States Patent
Lee et al.

(10) Patent No.: US 10,698,614 B2
(45) Date of Patent: Jun. 30, 2020

(54) MEMORY SYSTEM AND OPERATING METHOD THEREOF

(71) Applicant: SK hynix Inc., Gyeonggi-do (KR)

(72) Inventors: Joung Young Lee, Gyeonggi-do (KR); Yeong Sik Yi, Seoul (KR); Dae Geun Jee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 53 days.

(21) Appl. No.: 16/042,513

(22) Filed: Jul. 23, 2018

(65) Prior Publication Data

US 2019/0187918 A1 Jun. 20, 2019

(30) Foreign Application Priority Data

Dec. 20, 2017 (KR) ......................... 10-2017-0176576

(51) Int. Cl.
  *G06F 12/00* (2006.01)
  *G06F 13/00* (2006.01)
  *G06F 3/06* (2006.01)

(52) U.S. Cl.
  CPC .......... *G06F 3/0613* (2013.01); *G06F 3/0652* (2013.01); *G06F 3/0659* (2013.01); *G06F 3/0679* (2013.01)

(58) Field of Classification Search
  CPC .... G06F 3/0613; G06F 3/0652; G06F 3/0659; G06F 3/0679
  USPC ........................................................ 711/103
  See application file for complete search history.

(56) References Cited

U.S. PATENT DOCUMENTS

| | | | | |
|---|---|---|---|---|
| 6,092,215 A * | 7/2000 | Hodges | ............... | G06F 11/1076 711/114 |
| 6,640,267 B1 * | 10/2003 | Raza | ....................... | G06F 5/065 710/316 |
| 7,685,370 B1 * | 3/2010 | Duncan | ..................... | G06F 9/52 709/201 |
| 7,827,441 B1 * | 11/2010 | Wenzel | ............... | G06F 11/1076 711/130 |
| 9,639,287 B1 * | 5/2017 | Malina | ................ | G06F 16/1805 |
| 9,697,219 B1 * | 7/2017 | Wang | .................. | G06F 16/1734 |
| 2005/0228957 A1 * | 10/2005 | Satoyama | ........... | G06F 11/2069 711/162 |

(Continued)

FOREIGN PATENT DOCUMENTS

KR 101717081 3/2017
KR 1020170023734 3/2017

*Primary Examiner* — Sheng Jen Tsai
(74) *Attorney, Agent, or Firm* — IP & T Group LLP

(57) ABSTRACT

There are provided a memory system and an operating method thereof. A memory system includes: a semiconductor memory device for including a plurality of semiconductor memories, and operating in response to a plurality of internal commands received thereto; and a controller for generating and queuing the plurality of internal commands in response to a plurality of commands received from a host, and generating and storing a master bitmap including information on unperformed operations that are not performed in the semiconductor memory device for internal commands among the plurality of queued internal commands. The controller generates a flush bitmap corresponding to a flush command, using a current master bitmap, when the flush command is received from the host, and clears the flush bitmap if the semiconductor memory device completes the unperformed operations.

21 Claims, 6 Drawing Sheets

(56) References Cited

U.S. PATENT DOCUMENTS

| | | | |
|---|---|---|---|
| 2006/0265568 A1* | 11/2006 | Burton | G06F 12/0862 |
| | | | 711/216 |
| 2015/0317084 A1* | 11/2015 | Hwang | G06F 3/064 |
| | | | 711/154 |
| 2018/0217926 A1* | 8/2018 | Ogawa | G06F 12/00 |
| 2019/0043593 A1* | 2/2019 | Guo | G11C 16/30 |
| 2019/0087096 A1* | 3/2019 | Ramanujan | G06F 3/068 |
| 2019/0132415 A1* | 5/2019 | Viswanathan | H04L 67/289 |
| 2019/0147938 A1* | 5/2019 | Edirisooriya | G11C 11/40622 |

* cited by examiner

MEMORY SYSTEM AND OPERATING METHOD THEREOF

CROSS-REFERENCE TO RELATED APPLICATION

The present application claims priority under 35 U.S.C. § 119(a) to Korean patent application number 10-2017-0176576, filed on Dec. 20, 2017, which is incorporated herein by reference in its entirety.

BACKGROUND

1. Field of Invention

An aspect of the present disclosure relates generally to a memory system and an operating method thereof, and particularly, to a memory system having an improved operating speed and an operating method of the memory system.

2. Description of the Related Art

The paradigm on recent computer environment has been turned into ubiquitous computing environment in which it is possible to use computing systems anywhere and anytime. This promotes increasing usage of portable electronic devices such as mobile phones, digital cameras, notebook computers, and the like. Such portable electronic devices may generally include a memory system using a memory device, i.e., a data storage device. The data storage device is used as a main memory device or an auxiliary memory device of the portable electronic devices.

A data storage device using a memory device may have excellent stability and durability, high information access speed, and low power consumption, since there is no mechanical driving part. As an example of memory systems having such advantages, the data storage device may include a universal serial bus (USB) memory device, memory cards having various interfaces, a solid-state drive (SSD), and the like.

SUMMARY

Embodiments provide a memory system that can operate without blocking commands inputted next to a flush command even when the flush command is inputted in an operation of the memory system, and an operating method of the memory system.

In accordance with an aspect of the present disclosure, there is provided a memory system including: a semiconductor memory device configured to include a plurality of semiconductor memories, and operate in response to a plurality of internal commands received thereto; and a controller configured to generate and queue the plurality of internal commands in response to a plurality of commands received from a host, and generate and store a master bitmap including information on unperformed operations that are not performed in the semiconductor memory device for internal commands among the plurality of queued internal commands, wherein the controller may generate a flush bitmap corresponding to a flush command, using a current master bitmap, when the flush command is received from the host, and clears the flush bitmap if the semiconductor memory device completes the unperformed operations.

In accordance with another aspect of the present disclosure, there is provided a method for operating a memory system, the method including: generating a plurality of internal commands corresponding to a plurality of commands received from a host, and generating a plurality of local bitmaps respectively corresponding to the plurality of internal commands; generating a master bitmap, based on the plurality of local bitmaps, and updating the master bitmap whenever new local bitmaps are generated; when a flush command is received from the host, generating a flush bitmap, based on a current master bitmap; and when semiconductor memories output an operation completion signal by completing operations corresponding to the plurality of internal commands, clearing corresponding bits among bitmap data bits of the master bitmap and the flush bitmap.

BRIEF DESCRIPTION OF THE DRAWINGS

Example embodiments of the present invention will now be described more fully hereinafter with reference to the accompanying drawings; however, we note that the present invention may be embodied in different forms and should not be construed as limited to the embodiments set forth herein. Rather, these embodiments are provided so that this disclosure of the invention will be thorough and complete, and will fully convey the scope of the example embodiments to those skilled in the art.

We further note that in the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

In the following detailed description, only certain exemplary embodiments of the present disclosure have been shown and described, simply by way of illustration. As those skilled in the art would realize, the described embodiments may be modified in various ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Also, as used herein, the term "and/or" may include any and all combinations of one or more of the associated listed items.

In the following description, numerous specific details are set forth in order to provide a thorough understanding of the present invention. The present invention may be practiced without some or all these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Figure 1:
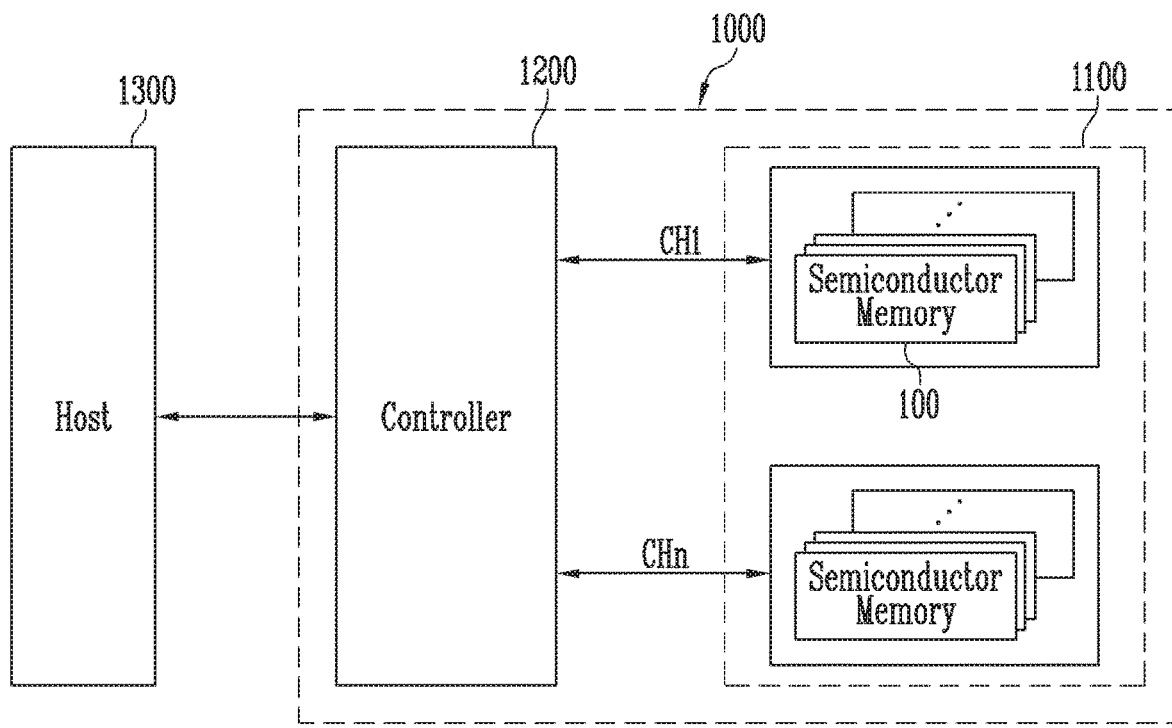
FIG. 1 is a block diagram illustrating a memory system in accordance with an embodiment of the present disclosure.

FIG. 1 is a block diagram illustrating a memory system 1000 in accordance with an embodiment of the present disclosure.

Referring to FIG. 1, the memory system 1000 may include a semiconductor memory device 1100 and a controller 1200. The semiconductor memory device 1100 may include a plurality of semiconductor memories 100. The plurality of semiconductor memories 100 may be divided into a plurality of groups.

In FIG. 1, the plurality of groups may communicate with the controller 1200 through respective first to nth channels CH1 to CHn. An exemplary semiconductor memory 100 will be described later with reference to FIG. 3.

Each group of the semiconductor memories 100 may be configured to communicate with the controller 1200 through a common channel. The controller 1200 may be configured to control the plurality of semiconductor memories 100. Each group of the semiconductor memories in the semiconductor memory device 1100 is coupled to controller 1200 through a dedicated channel among the plurality of channels CH1 to CHk.

The controller 1200 is coupled to a host 1300 and the semiconductor memory device 1100. The controller 1200 may be configured to access the semiconductor memory device 1100 in response to a request from the host 1300. For example, the controller 1200 may be configured to control read, write, erase, and background operations of the semiconductor memory device 1100. The controller 1200 may be configured to provide an interface between the semiconductor memory device 1100 and the host 1300. The controller 1200 may be configured to drive firmware for controlling the semiconductor memory device 1100.

The host 1300 may control the memory system 1000. The host 1300 may be or may include a portable electronic device such as a computer, a PDA, a PMP, an MP3 player, a camera, a camcorder, and a mobile phone. The host 1300 may request at least one of a write operation, a read operation, and an erase operation, etc. of the memory system 1000 through a command. If necessary, the host may transmit, to the memory system 1000, a flush command for checking whether a requested command (e.g., a write command, a read command, an erase command, etc.) has been performed within a specific time.

When write, read, and erase commands are received from the host 1300, the controller 1200 in accordance with an embodiment of the present disclosure may generate internal command corresponding to the received command and queues the internal commands according to an order of priority of the internal commands.

Also, the controller 1200 may generate local bitmaps corresponding to semiconductor memories 100 that are scheduled to perform operations in response to the queued internal commands, and may update a master bitmap, based on the generated local bitmaps. A local bitmap may include information indicating an address of a semiconductor memory 100 which may perform the requested operations in response to the queued internal commands. The master bitmap may include a plurality of bits respectively corresponding to a plurality of semiconductor memories 100. Each bit of the master bitmap may indicate whether a corresponding semiconductor memory 100 completes an operation in response to the internal commands. The master bitmap is updated as bits corresponding to semiconductor memories 100 which each received a command from the host 1300 but has not complete an operation corresponding to the received command are marked as a certain value (e.g., 1). After this, if a corresponding semiconductor memory 100 completes an operation (e.g., a read operation, a write operation, an erase operation, etc.) corresponding to the received internal command, the controller 1200 clears a bit corresponding to the corresponding semiconductor memory 100 among the bits of the master bitmap and sets it to an initial value (e.g., 0), The controller 1200 also clears a local bitmap corresponding to the semiconductor memory 100 for which the requested operation has been completed.

In addition, when a flush command is inputted from the host 1300, the controller 1200 may generate a flush bitmap corresponding to the flush command. In this case, the controller 1200 may generate the flush bitmap, based on the latest updated master bitmap. More specifically the flush bitmap may be generated by marking in the flush bitmap all semiconductor memories 100 that have not completed the operations which correspond to the queued internal commands. After this, if the bits marked in the flush bitmap are all reset to the semiconductor memories 100 marked in the flush bitmap have completed all operations (e.g., a write operation, a read operation, an erase operation, etc.) corresponding to the queued internal commands, the controller 1200 may transmit a flush command processing completion signal to the host 1300.

At this time, although more write, read, and erase commands may be received from the host 1300 after the flush command is inputted, the controller 1200 may receive the additional commands without blocking them, may generate continuously local bitmaps corresponding to the additional commands, and may continuously update the master bitmap. Thus, the memory system 1000 may operate continuously even when a flush command is inputted from the host 1300, and thus the operating speed of the memory system 1000 may be improved.

The controller 1200 and the semiconductor memory device 1100 may be integrated into a single semiconductor device. In an exemplary embodiment, the controller 1200 and the semiconductor memory device 1100 may be integrated into one semiconductor device, to constitute a memory card. For example, the controller 1200 and the semiconductor memory device 1100 may be integrated into one semiconductor device, to constitute a memory card such as a PC card (personal computer memory card international association (PCMCIA)), a compact flash (CF) card, a smart media card (SM or SMC), a memory stick, a multimedia card (MMC, RS-MMC or MMCmicro), an SD card (SD, miniSD, microSD or SDHC), or a universal flash storage (UFS).

The controller 1200 and the semiconductor memory device 1100 may be integrated into one semiconductor device to constitute a semiconductor drive (solid-state drive (SSD)). The semiconductor drive SSD may include a storage device configured to store data in a semiconductor memory. If the memory system 1000 is used as the semiconductor drive SSD, the operating speed of the host 1300 coupled to the memory system 1000 can be remarkably improved.

As another example, the memory system 1000 may be provided as one of various components of an electronic device such as a computer, a ultra mobile PC (UMPC), a workstation, a net-book, a personal digital assistant (PDA), a portable computer, a web tablet, a wireless phone, a mobile phone, a smart phone, an e-book, a portable multimedia player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

In an exemplary embodiment, the semiconductor memory device 1100 or the memory system 1000 may be packaged in various forms. For example, the semiconductor memory device 100 or the memory system 1000 may be packaged in a manner such as package on package (PoP), ball grid arrays (BGAs), chip scale packages (CSPs), plastic leaded chip carrier (PLCC), plastic dual in-line package (PDIP), die in Waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), thin quad flat pack (TQFP), system in package (SIP), multi chip package (MCP), wafer-level fabricated package (WFP), or wafer-level processed stack package (WSP).

Figure 2:
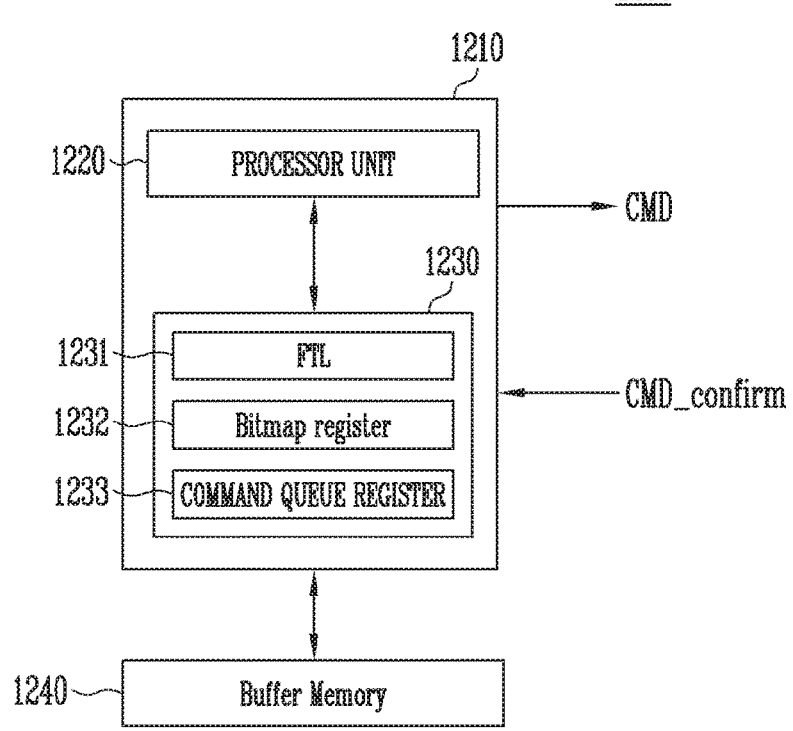
FIG. 2 is a block diagram illustrating an exemplary configuration of a controller employed in the memory system of FIG. 1.

FIG. 2 is a block diagram illustrating an exemplary configuration of the controller 1200 of FIG. 1.

Referring to FIG. 2, the controller 1200 may be configured to include a processor 1210 and a buffer memory 1240.

The processor 1210 may control the overall operations of the memory system 1000. When write, read, and erase commands are received from the host 1300 of FIG. 1, the processor 1210 in response to the received commands may generate and may output internal commands CMD corresponding to the received commands for controlling the semiconductor memory device 1100 to perform write, read, and/or erase operations corresponding to the internal commands. If the semiconductor memory device 1100 completes an operation corresponding to an internal command CMD, the processor 1210 may receive an operation completion signal CMD_confirm from the semiconductor memory device 1100. The processor 1210 may communicate data with the semiconductor memory device 1100 or the buffer memory 1240.

The processor 1210 may be configured to include a processor unit 1220 and a local memory 1230. The processor unit 1220 may drive 10o firmware of the local memory 1230 such as a flash translation layer (hereinafter, referred to as 'FTL'). The processor unit 1220 may be implemented with a microprocessor, a central processing unit (CPU), etc.

The processor unit 1220 may generate internal commands CMD corresponding to the write, read, and erase commands received from the host 1300 of FIG. 1, and queue the internal commands CMD according to an order of priority of the internal commands CMD.

The processor unit 1220 may generate a plurality of local bitmaps corresponding to semiconductor memories 100 that are scheduled to perform operations in response to the internal commands and may store the local bitmaps as a plurality of command slots in the bitmap register 1232. Also, the processor unit 1220 updates and set a master bitmap, based on the plurality of local bitmaps. The plurality of command slots and the master bitmap may be stored in the bitmap register 1232 of the local memory 1230.

For example, a local bitmap corresponding to a semiconductor memory 100 that is to perform an operation in response to an internal command may indicate whether the corresponding semiconductor memory 100 completes an operation in response to the internal commands. Each bit of the master bitmap which is updated using the plurality of local bitmaps may indicate whether the corresponding semiconductor memory 100 completes an operation in response to the internal commands.

As an example, the semiconductor memory device may be configured to include four semiconductor memories, and each local bitmap may be configured to have four bits. When a first semiconductor memory among the four semiconductor memories is to perform an operation corresponding to an internal command, a local bitmap corresponding to the first semiconductor memory may be generated as 0001. When a second semiconductor memory is to perform an operation corresponding to an internal command, a local bitmap corresponding to the second semiconductor memory may be generated as 0010. When a third semiconductor memory is to perform an operation corresponding to an internal command, a local bitmap corresponding to the third semiconductor memory may be generated as 0100. When a fourth semiconductor memory is to perform an operation corresponding to an internal command, a local bitmap corresponding to the fourth semiconductor memory may be generated as 1000. That is, the value of a bit among the four bits corresponding to a semiconductor memory which is to perform an operation based on an internal command is marked and generated as a set value (e.g., 1).

These local bitmaps are assigned with command slot numbers to be stored as a plurality of command slots in the bitmap register 1232.

In addition, the master bitmap may be updated based on the local bitmaps by combining the bit values of the local bitmaps. For example, when the first to fourth semiconductor memories are all scheduled to perform operations according to the internal commands, the master bitmap may have a bit value of 1111. When the first and third semiconductor memories are scheduled to perform operations corresponding to the internal commands, the master bitmap may have a bit value of 0101. When the second and fourth semiconductor memories are scheduled to perform operations corresponding to the internal commands, the master bitmap may have a bit value of 1010. That is, the master bitmap may indicate whether the semiconductor memories corresponding to the respective bits have performed operations corresponding to the internal commands.

In addition, if a semiconductor memory 100 completes an operation (e.g., a read operation, a write operation, an erase operation, etc.) corresponding to the received internal command, a bit corresponding to the corresponding semiconductor memory 100 among the corresponding local bitmap and the master bitmap may be reset to an initial value (e.g., 0).

In addition, when a flush command is inputted from the host 1300, the processor unit 1220 may generate a flush bitmap, based on information on the latest updated master bitmap. Therefore, the flush bitmap may include information on semiconductor memories 100 that have not completed at least one operation for the queued internal commands. When at least one semiconductor memory 100 marked in the flush bitmap completes all operations (e.g., a write operation, a read operation, an erase operation, etc.) corresponding to the received internal command, the processor unit 1220 may clear the flush bitmap, and transmit, to the host 1300, a response signal indicating that an operation corresponding to the flush command has been completed. The processor unit 1220 may continuously generate local bitmaps corresponding to commands inputted from the host 1300 after the flush command is inputted, and may continuously update the master bitmap, using the local bitmaps.

The local memory 1230 may be configured to include an FLT 1231, the bitmap register 1232, and a command queue register 1233. The FLT 1231 may store firmware, and may be driven by the processor unit 1220. The bitmap register 1232 may store a plurality of local bitmaps generated by the processor unit 1220 as command slots and may also store a master bitmap. The command queue register 1233 may store internal commands queued by the processor unit 1220.

The local memory 1230 may be or include a cache, a ROM, a PROM, an EPROM, a flash, an SRAM, and a DRAM.

The buffer memory 1240 may be used to temporarily store data to be stored in the semiconductor memory device 1100 or read from the semiconductor memory device 1100. The buffer memory 1240 may be implemented with a volatile memory or a nonvolatile memory. The buffer memory 1240 may be configured to implement an operation identical to that of the local memory 1230 described above.

Figure 3:
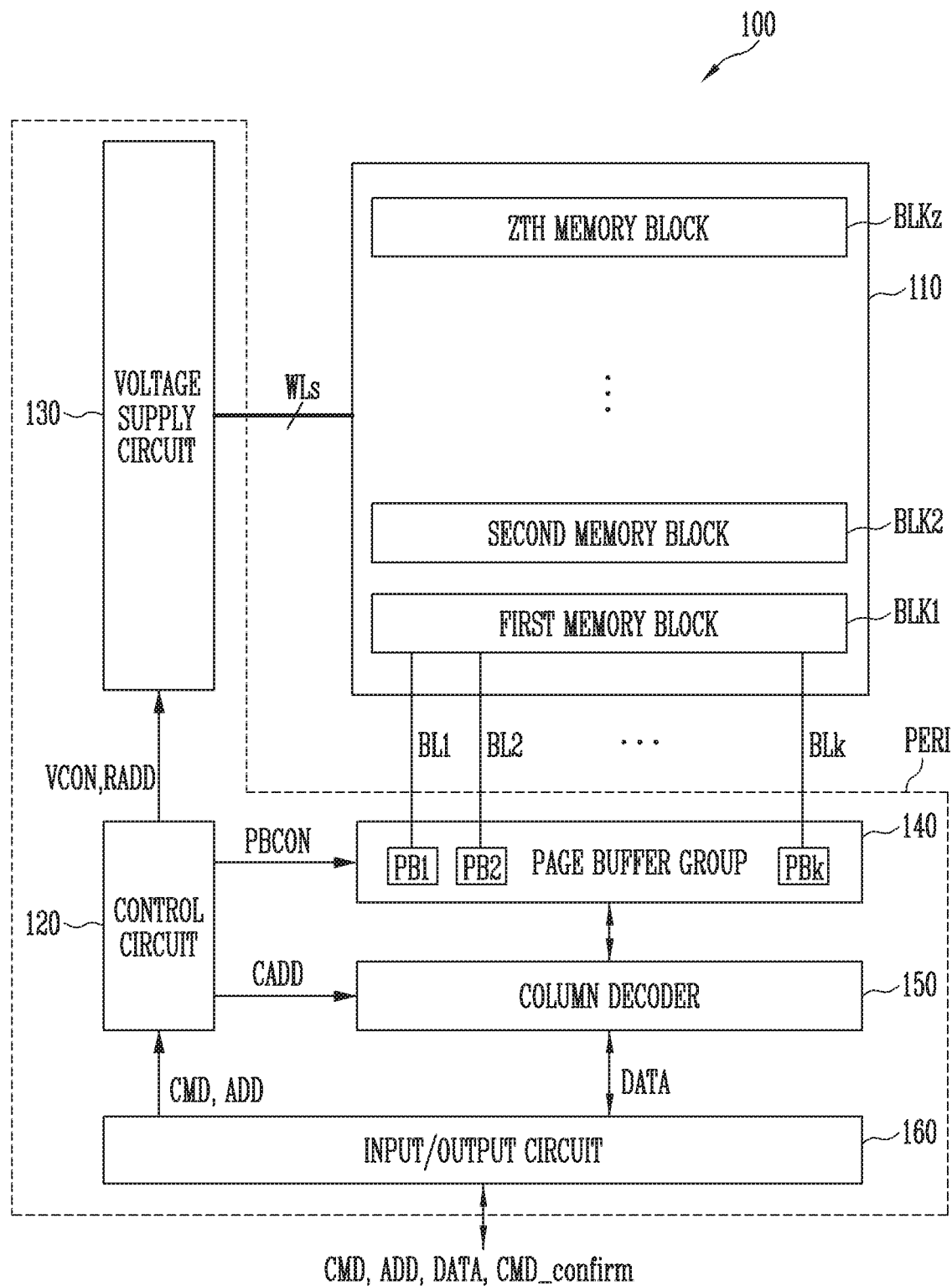
FIG. 3 is a block diagram illustrating an embodiment of a semiconductor memory employed in the memory system of FIG. 1.

FIG. 3 is a block diagram illustrating an embodiment of the semiconductor memory 100 of FIG. 1.

Referring to FIG. 3, the semiconductor memory 100 may include a memory cell array 110 including a plurality of memory blocks BLK1 to BLKz, and a peripheral circuit PERI configured to perform at least one of a program, read or erase operation of memory cells Included in a selected page of the plurality of memory blocks BLK1 to BLKz. The peripheral circuit PERI may include a control circuit 120, a voltage supply circuit 130, a page buffer group 140, a column decoder 150, and an input/output circuit 160.

The memory cell array may include a plurality of memory blocks BLK1 to BLKz. Each of the plurality of memory blocks BLK1 to BLKz may include a plurality of pages. Each of the plurality of pages may include a plurality of memory cells. In an embodiment, the plurality of memory cells may be nonvolatile memory cells. This will be described in more detail with reference to FIGS. 4 and 5.

The control circuit 120 may output a voltage control signal VCON for generating a voltage required to perform at least one of a program, read or erase operation in response to a command CMD inputted through the input/output circuit 160, and may output a PB control signal PBCON for controlling page buffers PB1 to PBk included in the page buffer group 140 according to the kind of operation. Also, the control circuit 120 may output a row address signal RADD and a column address signal CADD in response to an address signal ADD inputted from the outside through the input/output circuit 160.

The voltage supply circuit 130 supplies operating voltages required to perform operations of memory cells in response to the voltage control signal VCON of the control circuit 120 to local lines including a drain select line, word lines WLs, and a source select line of a selected memory block. The voltage supply circuit 130 may include a voltage generating circuit and a row decoder.

The voltage generating circuit may output operating voltages required to perform the various operations of memory cells to global lines in response to the voltage control signal VCON of the control circuit 120.

The row decoder may couple the global lines and the local lines such that the operating voltages output to the global lines by the voltage generating circuit can be transferred to the local lines of the selected memory block in the memory cell array 110.

The page buffer group 140 may include a plurality of page buffers PB1 to PBk coupled to the memory cell array 110 respectively through bit lines BL1 to BLk. The page buffers PB1 to PBk of the page buffer group 140 may selectively precharge the bit lines BL1 to BLk according to input data DATA so as to store the data DATA in the memory cells in response to the PB control signal PBCON of the control circuit 120, or sense voltages of the bit lines BL1 to BLk so as to read the data DATA from the memory cells.

The column decoder 150 may select the page buffers PB1 to PBk included in the page buffer group 140 in response to the column address signal CADD output from the control circuit 120. That is, the column decoder 150 sequentially may transfer data to be stored in the memory cells to the page buffers PB1 to PBk in response to the column address signal CADD. Also, the column decoder 150 sequentially may select the page buffers PB1 to PBk in response to the column address signal CADD such that data DATA of the memory cells, which are latched to the page buffers PB1 to PBk in a read operation, can be transmitted to the outside.

In order to input, to the page buffer group 140, data DATA input to be stored in the memory cells in a program operation, the input/output circuit 160 may transfer the data DATA to the column decoder 150 under the control of the control circuit 120. If the column decoder 150 transfers the data DATA transferred from the input/output circuit 160 to the page buffers PB1 to PBk of the page buffer group 140, the page buffers PB1 to PBk may store the input data DATA to latch circuits therein. Also, in a read operation, the input/output circuit 160 may output to the outside the data DATA transferred from the page buffers PB1 to PBk of the page buffer group 140 through the column decoder 150.

The semiconductor memory 100 in accordance with the present disclosure may perform a write operation, a read operation or an erase operation in response to an internal command CMD. If the write operation, the read operation or the erase operation is completed, completion information of an operation corresponding to the internal command CMD may be sent to the controller 1200 as an operation completion signal CMD_confirm.

Figure 4:
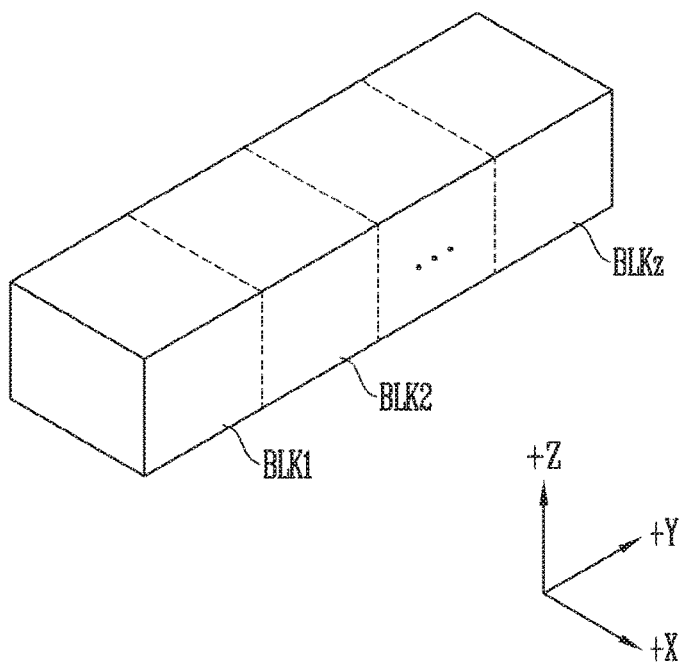
FIG. 4 is a block diagram illustrating an embodiment of a memory cell array employed in the semiconductor memory of FIG. 3.

FIG. 4 is a block diagram illustrating an embodiment of the memory cell array 110 of FIG. 3.

Referring to FIG. 4, the memory cell array 110 may include a plurality of memory blocks BLK1 to BLKz. Each memory block may have a three-dimensional structure. Each memory block may include a plurality of memory cells stacked above a substrate. The plurality of memory cells may be arranged along +X, +Y, and +Z directions. An exemplary structure of a memory block will be described in more detail with reference to FIG. 5.

Figure 5:
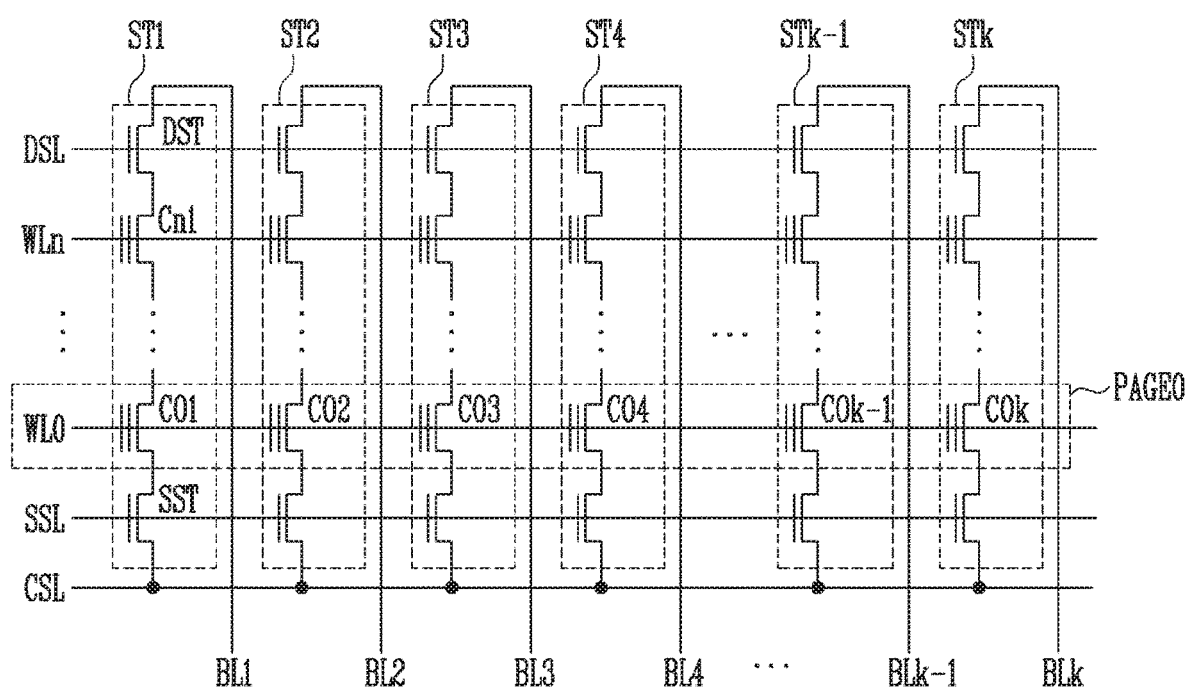
FIG. 5 is a circuit diagram illustrating an embodiment of a memory block of the memory cell array shown in FIG. 4.

FIG. 5 is a circuit diagram illustrating an exemplary structure of a memory block shown in FIG. 4.

Referring to FIG. 5, each memory block may include a plurality of strings ST1 to STk coupled between bit lines BL1 to BLk and a common source line CSL. That is, the strings ST1 to STk may be coupled to corresponding bit lines BL1 to BLk, respectively, and may be commonly coupled to the common source line CSL. Each string ST1 may include a source select transistor SST having a source coupled to the common source line CSL, a plurality of memory cells C01 to Cn1, and a drain select transistor DST having a drain coupled to the bit line BL1. The memory cells C01 to Cn1 may be coupled in series between the select transistors SST and DST. A gate of the source select transistor SST may be coupled to a source select line SSL, gates of the memory cells C01 to Cn1 may be coupled to word lines WL0 to WLn, respectively, and a gate of the drain select transistor DST may be coupled to a drain select line DSL.

Memory cells included in a memory block may be divided in units of physical pages or logical pages. For example, the memory cells C01 to C0$k$ coupled to one word line (e.g., WL0) may constitute one physical page PAGE0. Such a page may become a basic unit of the program operation or the read operation.

Figure 6:
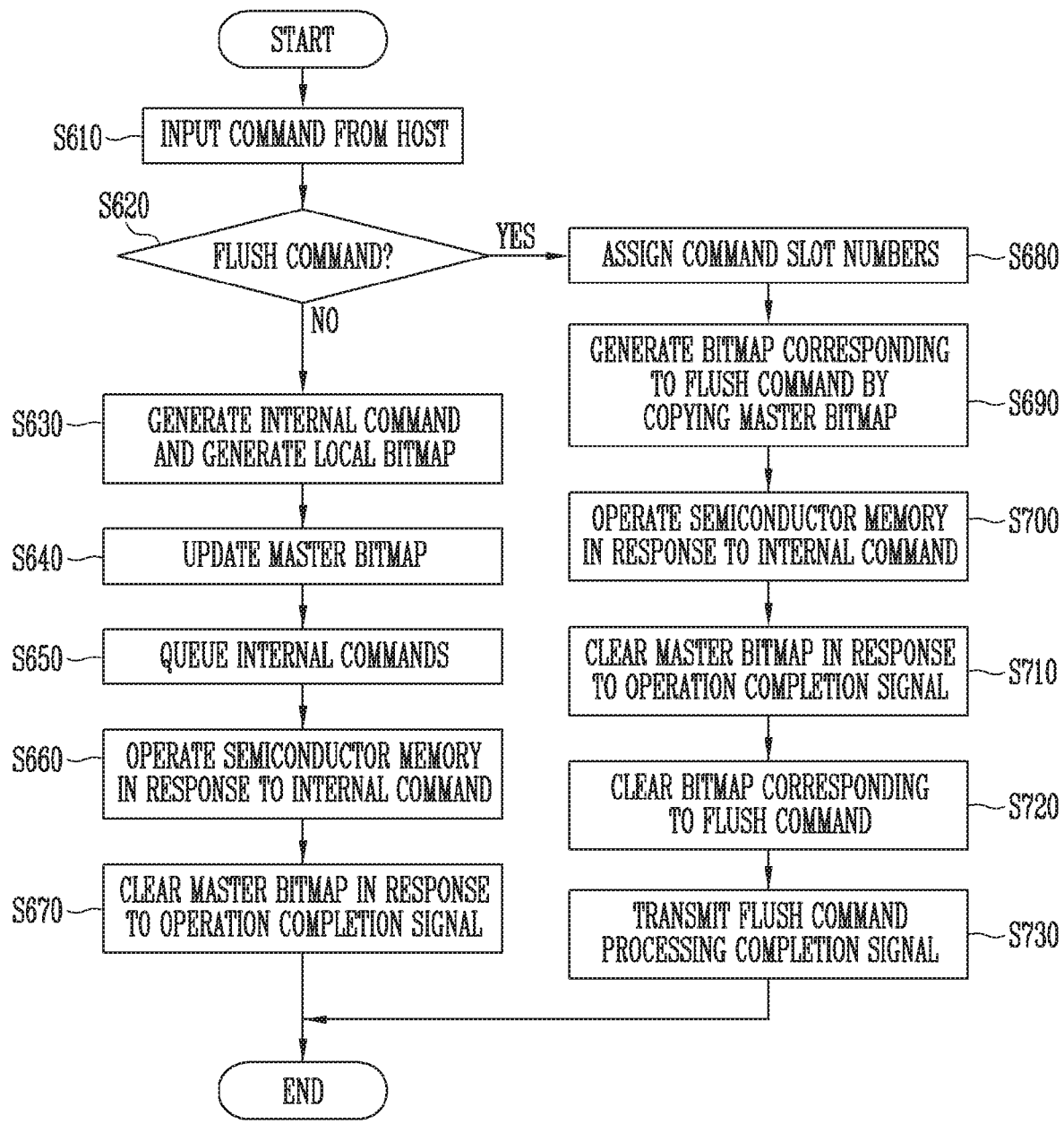
FIG. 6 is a flowchart illustrating an operating method of the memory system in accordance with an embodiment of the present disclosure.

FIG. 6 is a flowchart illustrating an operating method of the memory system 1000 in accordance with an embodiment of the present disclosure.

Figure 7:
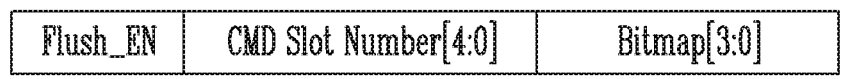
FIG. 7 is a configuration diagram illustrating a data set of a flush bitmap corresponding to a flush command in accordance with an embodiment of the present disclosure.

FIG. 7 is a configuration diagram illustrating a data set of a flush bitmap in accordance with an embodiment of the present disclosure.

Figure 8:
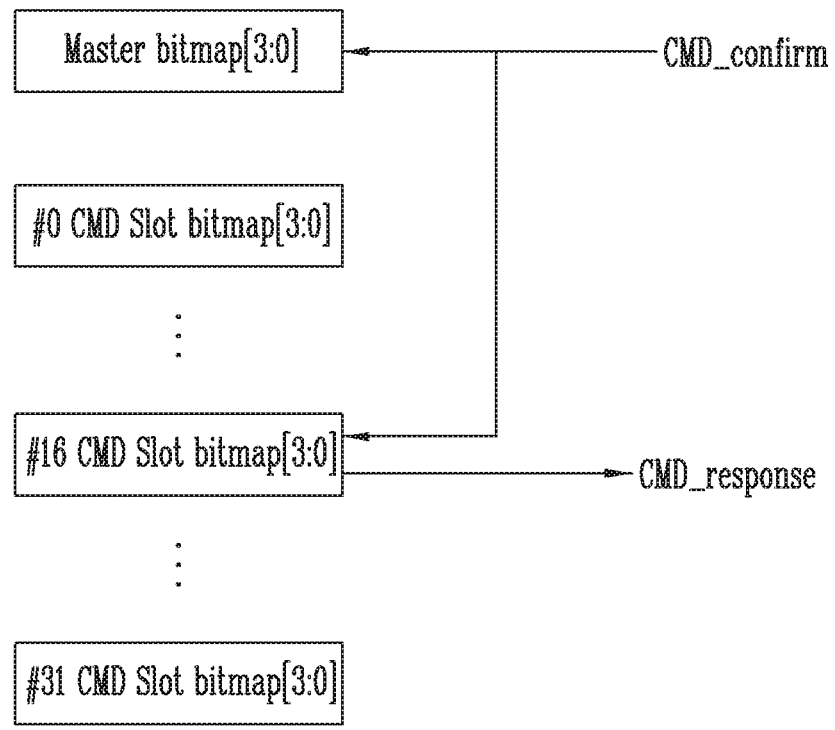
FIG. 8 is a configuration diagram illustrating command slots in accordance with an embodiment of the present disclosure.

FIG. 8 is a configuration diagram illustrating command slots in accordance with an embodiment of the present disclosure.

The operating method of the memory system in accordance with an embodiment of the present disclosure will be described as follows with reference to FIGS. 1 to 8.

In an embodiment of the present disclosure, for convenience of description, a case where the semiconductor memory device 1100 may be configured to include first to fourth semiconductor memories 100, and 32 command slots #0 to #31 CMD Slot bitmap[3:0] are stored in the bitmap register 1232 will be described as an example.

If a command is received from the host 1300 at step S610, the processor 1210 of the controller 1200 may determine whether the received command is a flush command at step S620.

When as a result of the above determination, the received command is not a flush command ("NO" at step S620), the processor 1210 may generate an internal command CMD corresponding to the received command, and generate a local bitmap corresponding to the internal command CMD at step S630. For example, the command may be a write, read or an erase command. The local bitmap may be generated based on the address of a semiconductor memory that is to perform the internal command CMD among the first to fourth semiconductor memories 100. For example, when the first semiconductor memory among the first to fourth semiconductor memories 100 is to perform an operation corresponding to the internal command CMD, a bitmap corresponding to the first semiconductor memory is generated as 0001. When the second semiconductor memory among the first to fourth semiconductor memories 100 is to perform an operation corresponding to the internal command CMD, a bitmap corresponding to the second semiconductor memory may be generated as 0010. When the third semiconductor memory among the first to fourth semiconductor memories 100 is to perform an operation corresponding to the internal command CMD, a bitmap corresponding to the third semiconductor memory may be generated as 0100. When the fourth semiconductor memory among the first to fourth semiconductor memories 100 is to perform an operation corresponding to the internal command CMD, a bitmap corresponding to the fourth semiconductor memory may be generated as 1000. The generated local bitmap is assigned with command slot numbers corresponding to 32 command slots as shown in FIG. 8 to be stored in the bitmap register 1232.

Steps S610 to S630 are repeatedly performed for each command that is continuously inputted, thus generating a plurality of internal commands and a plurality of local bitmaps corresponding thereto.

The processor unit 1220 updates a master bitmap, using the plurality of local bitmaps at step S640. The processor unit 1220 may update the master bitmap whenever a new local bitmap is generated. The master bitmap is updated by marking to a certain value (e.g., 1) a bit corresponding to a semiconductor memory 100 which received a command from the host 1300 and which has not completed an operation corresponding to the received command.

The processor unit 1220 may align and queue the generated internal commands according to an order of priority at step S650. The queued internal commands may be stored in the local memory 1230.

The processor unit 1220 may transmit the queued internal commands to a selected semiconductor memory among the first to fourth semiconductor memories 100, and the selected semiconductor memory may perform an operation, e.g., a write, read or erase operation in response to the internal command CMD received thereto at step S660.

When the selected semiconductor memory completes the write, read or erase operation corresponding to the received internal command CMD, the selected semiconductor memory may output an operation completion signal CMD_confirm to the controller 1200. The processor unit 1220 of the controller 1200 may delete the corresponding internal command among the queued internal commands in response to the operation completion signal CMD_confirm received from the semiconductor memory device 1100, and may remove the local bitmap stored in a command slot corresponding to the deleted internal command in response to the operation completion signal CMD_confirm. Also, the processor unit 1220 may clear (or update) the master bitmap by resetting the bit value of the bit of the master bitmap which corresponds to the deleted command to an initial value (e.g., 0) at step S670.

As the determined result of the step S620, when the command received from the host 1300 is the flush command ("YES"), the processor 1210 may assign command slot numbers to a flush bitmap at step S680.

Then, the processor 1210 may generate the flush bitmap by copying bitmap information of the master bitmap and may store the flush bitmap in the bitmap register 1232 at step S690. A data set of the flush bitmap is as shown in FIG. 7.

Referring to FIG. 7, the flush bitmap may be configured to include an enable bit Flush_EN indicating that the received command is the flush command, slot number bits CMD Slot Number[4:0] indicating the assigned command slot numbers, and bitmap data bits Bitmap[3:0]. In the embodiment of the present disclosure, a case where #16 command slot among the 32 command slots is assigned to the flush bitmap will be described as an example. The bitmap data bit Bitmap[3:0] is the same as the master bitmap when the flush command is inputted.

The processor unit 1220 may continue to transmit internal commands queued even after the flush command is inputted to a selected semiconductor memory among the first to fourth semiconductor memories 100, and the selected semiconductor memory may perform a write, read or erase operation in response to an internal command received thereto at step S700.

The selected semiconductor memory may then complete the write, read or erase operation corresponding to the received internal command CMD and may output an operation completion signal CMD_confirm. The processor unit 1220 may then delete an internal command an operation in response to which has been completed among the queued internal commands in response to the operation completion signal CMD_confirm received from the semiconductor memory device 1100, and remove a local bitmap stored in a command slot corresponding to the internal command in response to the operation completion signal CMD_confirm. Also, the processor unit 1220 may clear or update the master bit map by resetting a bit value of the master bitmap which corresponds to the semiconductor memory which has completed the command to an initial value (e.g., 0) at step S710. In this case, the master bitmap may be continuously updated using local bitmaps corresponding to subsequent commands which are additionally inputted from the host 1300 after the flush command is inputted.

The processor unit 1220 clears (resets) a bit corresponding to the semiconductor memory 100 that has transmitted the operation completion signal CMD_confirm among the bitmap data bit Bitmap[3:0] of the flush bitmap to an initial value (e.g., 0) in response to the operation completion signal CMD_confirm received from the semiconductor memory device 1100 at step S720. In this case, when all bits of the bitmap data bit Bitmap[3:0] of the flush bitmap are reset to an initial value (e.g., 0), the processor unit 1220 deletes the flush bitmap, and may output a flush command processing completion signal CMD_response to the host 1300 at step S730.

As described above, in accordance with the embodiment of the present disclosure, a flush bitmap is generated when a flush command is inputted from the host 1300. In this case, the flush bitmap is generated based on the latest updated master bitmap. Thus, all semiconductor memories 100 that have not completed the operations for the queued internal commands are marked in the flush bitmap. After this, if the marked bits of the flush bitmap are all reset to the semiconductor memories 100 marked in the flush bitmap have completed all operations (e.g., a write operation, a read operation, an erase operation, etc.) corresponding to the queued internal commands, the controller 1200 may transmit a flush command processing completion signal to the host 1300. At this time, although subsequent commands are additionally received from the host 1300 after the flush command is input, the controller 1200 may receive the subsequent commands without blocking the received commands, may generate continuously local bitmaps corresponding to the subsequent commands, and thereby continuously update the master bitmap. Thus, the memory system 1000 may continue to operate even when a flush command is inputted from the host 1300, so that the operating speed of the memory system 1000 may be improved.

Figure 9:
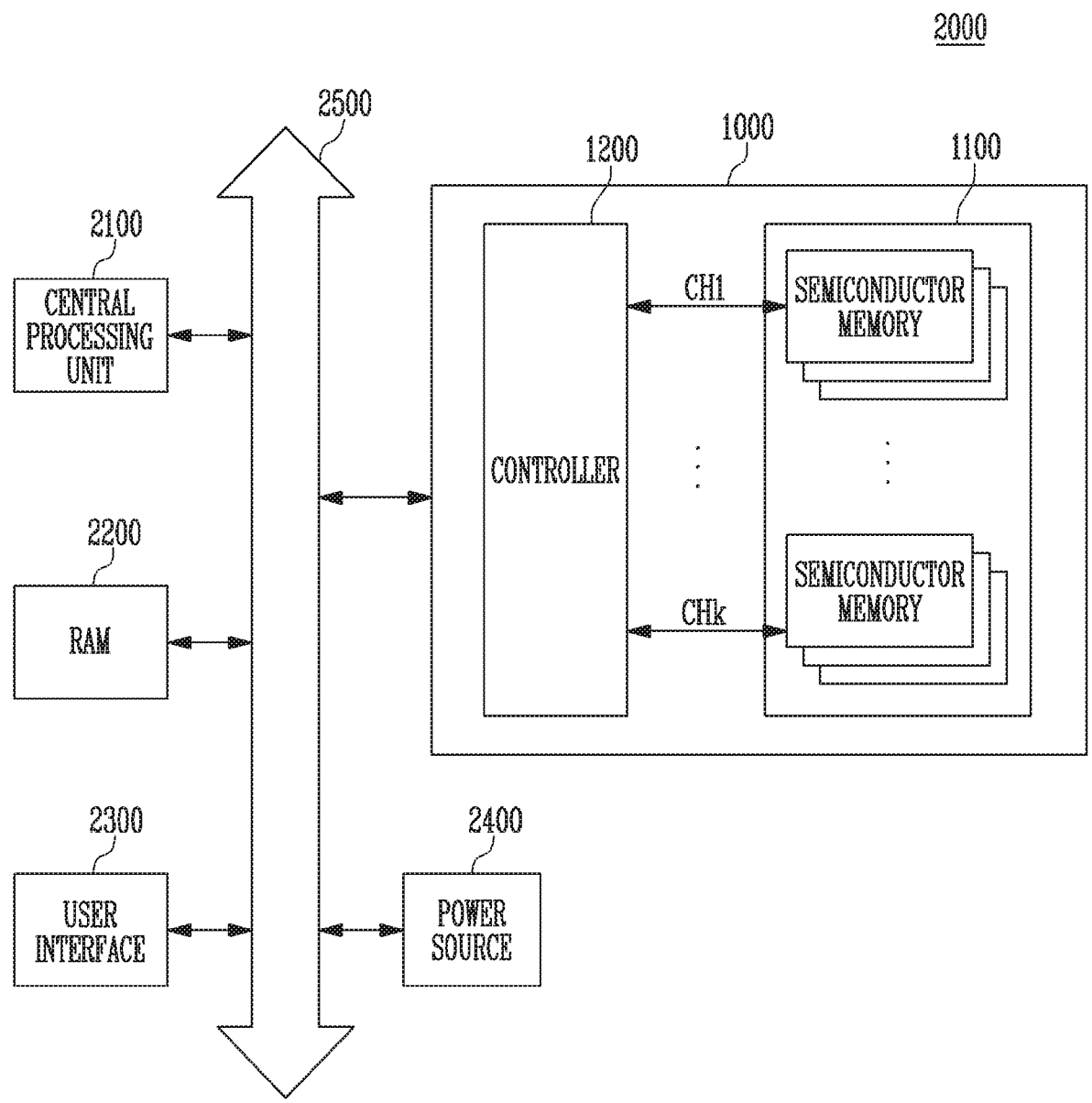
FIG. 9 is a block diagram illustrating a computing system including the memory system described with reference to FIG. 1.

FIG. 9 is a block diagram illustrating a computing system including the memory system described with reference to FIG. 1.

Referring to FIG. 9, the computing system 2000 may include a central processing unit 2100, a RAM 2200, a user interface 2300, a power source 2400, a system bus 2500, and a memory system 1000.

The memory system 2000 is electrically coupled to the central processing unit 2100, the RAM 2200, the user interface 2300, and the power source 2400 through the system bus 2500. Data supplied through user interface 2300 or data processed by the central processing unit 2100 are stored in the memory system 1000.

In FIG. 9, it is illustrated that the semiconductor memory device 1100 is coupled to the system bus 2500 through the controller 1200. However, the semiconductor memory device 1100 may be directly coupled to the system bus 2500. In this case, the function of the controller 1200 may be performed by the central processing unit 2100 and the RAM 2200.

In accordance with the present disclosure, the memory system operates without blocking commands input next to a flush command even when the flush command is input in an operation of the memory system. Thus, the memory system can continuously operate, and accordingly, the operating speed of the memory system can be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
   a semiconductor memory device configured to include a plurality of semiconductor memories, and operate in response to a plurality of internal commands received thereto; and
   a controller configured to generate and queue the plurality of internal commands in response to a plurality of commands received from a host, and generate and store a master bitmap including information on unperformed operations that are not performed in the semiconductor memory device for internal commands among the plurality of queued internal commands,
   wherein the controller generates a flush bitmap corresponding to a flush command, using a current master bitmap, when the flush command is received from the host, and clears the flush bitmap if the semiconductor memory device completes the unperformed operations, and
   wherein when additional commands are received from the host before the unperformed operations are completed after the flush command is received, the controller updates the master bitmap by continuously generating bitmaps corresponding to the additional commands without blocking the additional commands.

2. The memory system of claim 1, wherein the controller includes a processor configured to generate the plurality of internal commands for controlling the semiconductor memory device and output the plurality of internal commands to the semiconductor memory device if the plurality of commands are input from the host, and receives an operation completion signal from the semiconductor memory device if the semiconductor memory device completes operations of the plurality of internal commands.

3. The memory system of claim 2, wherein the processor includes a processor unit configured to generate the plurality of internal commands, and align and queue the plurality of internal commands according to an order of priority.

4. The memory system of claim 3, wherein the processor unit generates a plurality of local bitmaps corresponding to the plurality of internal commands.

5. The memory system of claim 4, wherein the processor unit further includes a local memory configured to store the plurality of local bitmaps.

6. The memory system of claim 4, wherein the processor unit assigns a command slot number to each of the plurality of local bitmaps and stores the command slot numbers as a plurality of command slots.

7. The memory system of claim 4,
wherein each of the plurality of local bitmaps is configured with bits respectively corresponding to the plurality of semiconductor memories included in the semiconductor memory device,
wherein a bit corresponding to a semiconductor memory that is to perform a corresponding internal command among the plurality of internal commands is marked as a set value.

8. The memory system of claim 7, wherein the processor unit generates the master bitmap by combining the plurality of local bitmaps, and updates the master bitmap when a new local bitmap is generated.

9. The memory system of claim 8, wherein the processor unit receives the operation completion signal, deletes a local bitmap corresponding to the operation completion signal among the plurality of local bitmaps, and clears a bit corresponding to a semiconductor memory of which operation has been completed as an initial value in the master bitmap.

10. The memory system of claim 8, wherein the flush bitmap is configured to include an enable bit indicating that the flush bitmap is a bitmap corresponding to the flush command, slot number bits indicating the assigned command slot numbers of the flush bitmap, and bitmap data bits.

11. The memory system of claim 10, wherein the processor unit generates the bitmap data bits of the flush bitmap by copying bitmap data bits of the master bitmap.

12. The memory system of claim 11, wherein the processor unit clears a bit corresponding to the semiconductor memory of which operation has been completed among the bitmap data bits of the flush bitmap as an initial value.

13. The memory system of claim 12, wherein the processor unit transmits a flush command processing completion signal to the host when the bitmap data bits of the flush bitmap are all reset to an initial value.

14. The memory system of claim 12, wherein the processor unit deletes the flush bitmap when the bitmap data bits of the flush bitmap are all reset to an initial value.

15. A method for operating a memory system, the method comprising:
generating a plurality of internal commands corresponding to a plurality of commands received from a host, and generating a plurality of local bitmaps respectively corresponding to the plurality of internal commands;
generating a master bitmap, based on the plurality of local bitmaps, and updating the master bitmap whenever new local bitmaps are generated;
when a flush command is received from the host, generating a flush bitmap, based on a current master bitmap;
when semiconductor memories output an operation completion signal by completing operations corresponding to the plurality of internal commands, clearing corresponding bits among bitmap data bits of the master bitmap and the flush bitmap; and
when additional commands are received from the host after the flush bitmap is generated, updating the master bitmap by generating additional internal commands corresponding to the additional commands and generating a plurality of bitmaps corresponding to the additional internal commands, respectively.

16. The method of claim 15, wherein the master bitmap is continuously updated by new local bitmaps corresponding to the additional commands input after the flush command is input.

17. The method of claim 15, wherein, when the bitmap data bits of the flush bitmap are all cleared, a flush command processing completion signal is transmitted to the host.

18. The method of claim 17,
wherein a local bitmap corresponding to the operation completion signal among the plurality of local bitmaps is deleted, and
the flush bitmap is deleted when the bitmap data bits of the flush bitmap are all cleared.

19. The method of claim 15, wherein the bitmap data bits of the master bitmap are generated as unperformed operations that are not performed by the semiconductor memories for internal commands among the plurality of internal commands are marked as a set value.

20. The method of claim 15, wherein the bitmap data bits of the flush bitmap are generated by copying the bitmap data bits of the current master bitmap.

21. A memory system comprising:
a memory device including a plurality of memories; and
a controller including a master bitmap having a plurality of master bits respectively corresponding to the memories, each master bit indicating an outstanding operation to a corresponding memory, and suitable for:
updating the master bitmap and controlling the memory device to perform operations to the memories in response to a plurality of external normal commands, and resetting the master bits according to completion of the operations corresponding to the master bits; and
generating a flush bitmap, which is the master bitmap at a time when a flush command is provided, controlling the memory device to perform operations to the memories according to flush bits included in the flush bitmap, and providing a completion signal when all of the flush bits are reset according to completion of the operations corresponding to the flush bits,
wherein the controller updates and resets the master bits and the flush bits independently, and
wherein when additional commands are received from the host after the flush bitmap is generated, the controller updates the master bitmap in response to the additional commands without blocking the additional commands.

* * * * *